Figure 1:
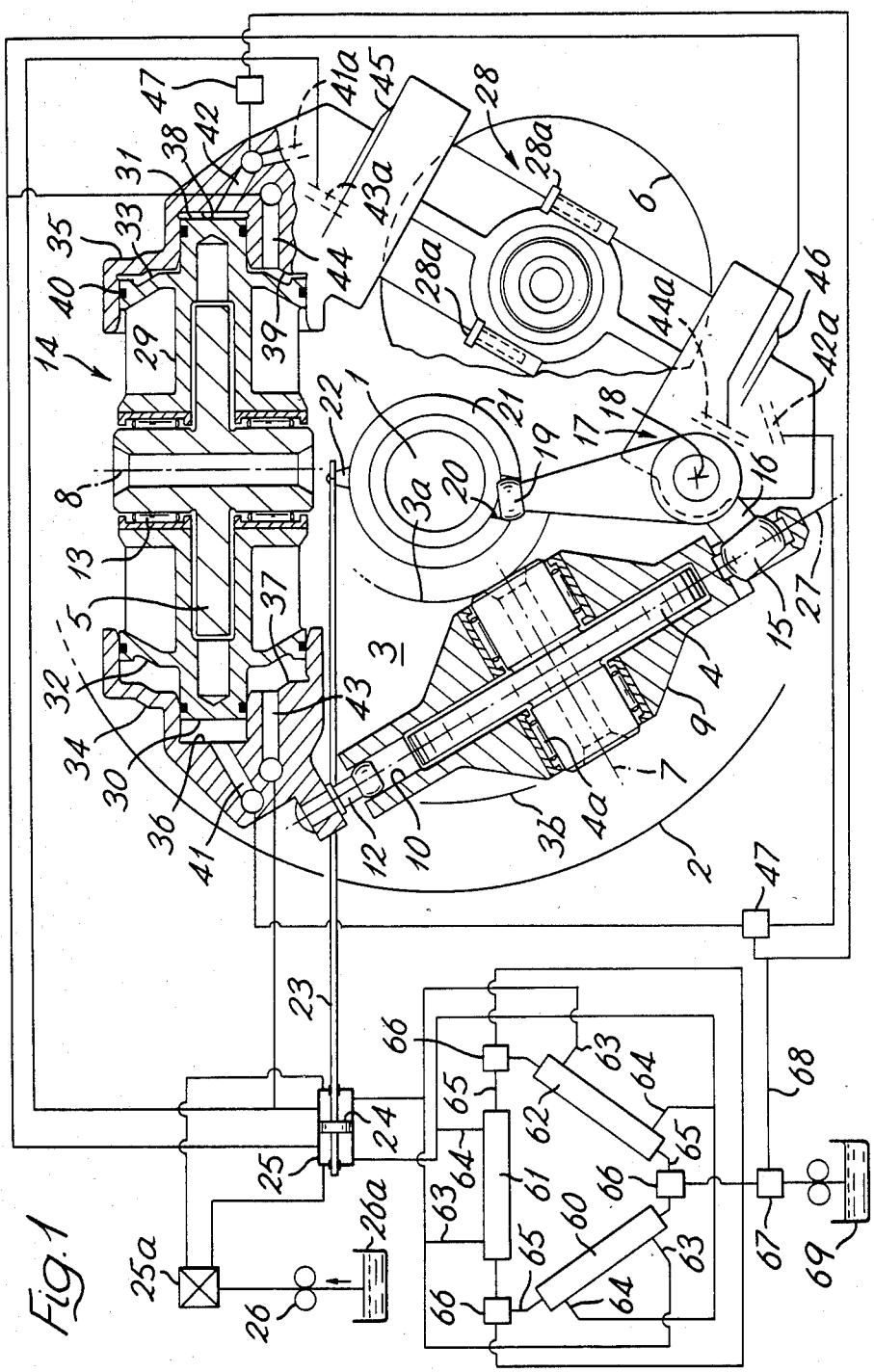

United States Patent [19]

Perry

[11] Patent Number: 4,499,782
[45] Date of Patent: Feb. 19, 1985

[54] TRANSMISSION UNITS OF THE TOROIDAL RACE ROLLING FRICTION TYPE

[75] Inventor: Forbes G. D. Perry, Charlbury, England

[73] Assignee: National Research Development Corporation, London, England

[21] Appl. No.: 426,127

[22] Filed: Sep. 28, 1982

[30] Foreign Application Priority Data

Oct. 5, 1981 [GB] United Kingdom ............... 8130049

[51] Int. Cl.$^3$ .................... F16H 15/00; F16H 15/16; F16H 15/08
[52] U.S. Cl. .................................... 74/200; 74/190; 74/193; 74/199; 74/201
[58] Field of Search ............... 74/190, 191, 199, 200, 74/201, 193, 690

[56] References Cited

U.S. PATENT DOCUMENTS

| | | | |
|---|---|---|---|
| 2,850,911 | 9/1958 | Kraus | 74/200 |
| 3,142,189 | 7/1964 | Davis et al. | 74/200 |
| 3,153,938 | 10/1964 | Perry | 74/200 |
| 3,276,279 | 10/1966 | Perry et al. | 74/190.5 |
| 3,327,545 | 6/1967 | Petty | 74/190.5 |
| 3,828,618 | 8/1974 | Sharpe et al. | 74/200 |

FOREIGN PATENT DOCUMENTS

| | | | |
|---|---|---|---|
| 104627 | 5/1923 | Switzerland | 74/690 |
| 1032004 | 6/1966 | United Kingdom. | |
| 1392440 | 4/1975 | United Kingdom. | |
| 1392707 | 4/1975 | United Kingdom. | |
| 2023753A | 1/1980 | United Kingdom. | |

Primary Examiner—Lawrence J. Staab
Assistant Examiner—Michael David Bednarek
Attorney, Agent, or Firm—Cushman, Darby & Cushman

[57] ABSTRACT

A toroidal race rolling friction transmission unit in which hydraulic actuators act upon most of the rollers to cause them to change ratio angle, but in which one of the rollers has a mechanical mechanism by which precise increments of ratio-change may be imparted. A hydraulic device senses the torque reaction of that roller, and is hydraulically linked to the actuators of the other rollers so that they are subjected to a force equal to the reaction force experienced by the mechanically-actuated roller. The hydraulic actuators may be in the form of two-step piston-and-cylinder devices, the actuating forces being exerted in one step, while a damping force is exerted in the other step. In a "double-ended" transmission, in which a double-faced output disc is located between two oppositely-facing input discs, a single mechanically-actuated roller located between the output disc and one of the input discs may suffice, all the remaining rollers operating against either input disc being driven by hydraulic actuators, the pressure in all of which is related to that in reaction-sensing member of the first roller.

7 Claims, 2 Drawing Figures

TRANSMISSION UNITS OF THE TOROIDAL RACE ROLLING FRICTION TYPE

This invention relates to transmission units of the so-called "toroidal race rolling friction" type, by which we mean the type wherein rollers provide a driving connection between the facing coaxial and toroidal surfaces of an input disc and an output disc, the rollers being mounted for rotation about axes which extend in a generally radial direction from, and normally intersect, the rotational axis common to the input and output discs (hereinafter called the "main axis"). An "end load" is provided to urge the input and output discs axially towards each other, so that the frictional reaction between the toroidal face of each disc and the rollers is sufficient for the rollers to transmit the necessary driving torque from the input to the output discs. Many transmission units of this type, with examples of many standard features suitable also for use in units according to the present invention, are to be found in the prior art. See, for instance, UK Pat. No. 979062 (equivalent U.S. Pat. No. 3,153,938), UK No. 1069874 (U.S. Pat. No. 3,276,279) and UK No. 1073484 (U.S. Pat. No. 3,327,545).

In a transmission unit of the type described changes of ratio are obtained by changing the angle, hereinafter called the "ratio angle", between the rotational axis of each roller and the main axis. For convenience of description the ratio angle is considered as zero when the rotational axis of a roller is normal to the main axis. It is impracticable to change the ratio angles of the rollers by direct action because the forces required are too great. However it is both known and practicable to effect changes of ratio angle by causing the rollers to steer themselves along helical paths over the toroidal surfaces of the discs until a desired ratio angle is obtained. The condition necessary for a roller to steer itself into a different ratio angle in this way is that the roller rotational axis should cease to intersect the main axis.

This may be brought about by mounting the roller so that it can be moved in a mode which provides at least a substantial component of motion in the form of bodily translation of the roller substantially along the line of the axis, hereinafter called the "ratio angle axis", about which ratio angle changes are made. Motion of this form is hereinafter called "tangential shift displacement".

In such transmissions it is known to effect the movement of all the rollers by similar and essentially mechanical means. For instance, as in UK Pat. No. 979062, each roller may be mounted in a separate pivotally-mounted carriage, and a single mechanical control member may be linked to each carriage by arms or other linkages so that movement of the control member must mechanically result in an equal tangential shift of each carriage and in consequence in an equal change of ratio angle for each roller. Such mechanical systems tend to be complex and expensive, requiring many parts—some with a long throw of movement—to be both accomodated and accurately fitted within a restricted space. However with a roller mounted in this way the reaction forces to which it is subjected in the course of transmitting torque from the input disc to the output disc are applied to the means by which ratio change motions of the roller are controlled, and as an alternative to the purely mechanical way, just described, of ensuring that all rollers maintain the same ratio angle at all times, it is known instead to make use of the reaction forces to ensure that the rollers all bear equal shares of the load by individually adjusting the ratio angles until the torque reaction forces to which each one is subjected are in balance with the control force applied to the roller mounting to maintain it in the equilibrium position or to initiate a change of ratio.

A typical example of a transmission unit having this type of roller mounting is described in UK Pat. No. 1069874 wherein actuators operated by fluid pressure position the rollers substantially along the lines of their ratio angle axes. The actuators are supplied with fluid at the same pressure from a common source, the delivery pressure of which may be varied to initiate changes of ratio. Each roller will undergo a tangential shift displacement if the torque reaction applied to it is not in balance with the fluid pressure in the associated actuator, and the geometry is such that the change of ratio angle initiated by such displacement is in the direction which will change the torque reaction applied to the roller in the sense tending to equate that torque reaction with the force supplied by the actuator. If all the actuators, being supplied with the same pressure from the common source, have the same effective piston area then the rollers will automatically assume ratio angles at which they bear equal shares of the torque transmitted by the transmission unit.

It has however been found that where the rollers are all hydraulically moved in this way the transmission is, in certain circumstances, prone to oscillation of the type wherein a roller may undergo a tangential shift displacement and the resulting change of ratio will give rise to a corrective tangential shift displacement which overshoots the equilibrium condition. This leads to a ratio angle change in the opposite direction followed by a further corrective tangential shift displacement which again overshoots the equilibrium position and this process may build up to an unacceptable amplitude of oscillation.

The present invention arises from appreciating the potential advantages of a transmission in which the roller control mechanism represents a compromise between the wholly mechanical and wholly hydraulic systems just described. According to the invention a toroidal race rolling friction transmission unit comprises an input disc and an output disc and a plurality of rollers providing a driving connection between them, in which there are means to impart precise increments of tangential shift to a first of the rollers by mechanical means whereby to cause it to change ratio angle, in which there are means to sense the reaction force to which that roller is subjected in the course of transmitting torque from the input disc to the output disc, in which at least some of the remainder of the plurality of rollers are mounted to execute their tangential shift in response to fluid pressure-operated actuators, and in which these actuators are adapted to act with a force matching the reaction force of the first roller.

Preferably the reaction-sensing member of the first roller comprises a hydraulic cylinder device, and all rollers but the first are also actuated by hydraulic piston-and-cylinder devices, and opposite ends of these devices are hydraulically linked in parallel to opposite ends of the reaction cylinder of the first roller.

All rollers but the first—that is to say, all the "hydraulic" rollers—may also be interlinked by a hydraulic damping system common to them. The purpose of this damping is to stabilise the movements of the rollers and prevent build-up of the sustained oscillation already described. The mechanically controlled "first" roller, however, will tend to be naturally damped to a sufficient extent because of the geometry of its mechanical linkage and the much greater travel that is required of the piston to operate that linkage.

The hydraulic actuators of the hydraulic rollers may be in the form of two-step piston-and-cylinder devices, one of such steps being linked to the first piston reaction cylinder and generating the main actuation forces as already described, and the other step being connected by way of damping means with corresponding steps in the actuators of the remaining hydraulic rollers to exert the damping action already described.

In a typical group of three rollers providing a driving connection between a single input disc and a single output disc, the first roller may be mechanically operated and the other two may be hydraulic. In one well known form of toroidal race rolling friction transmission unit, however, a single output disc is formed with oppositely-facing toroidal races on both of its faces and is located between two input discs each formed with an inward-facing toroidal race: one set of rollers transmits drive from the first input disc to the output disc, while a second set which preserves a common ratio angle with the first set transmits drive from the second input disc to the other face of the output disc. In such a construction, according to the present invention, only one of the two sets of rollers need contain a mechanically operated roller. All the rollers—typically three—of the second set could be hydraulic, the actuators of this set being linked in parallel with the reaction cylinder of the mechanically operated roller, and in series with themselves and in connection with the hydraulic rollers of the first set for damping purposes.

Figure 2:
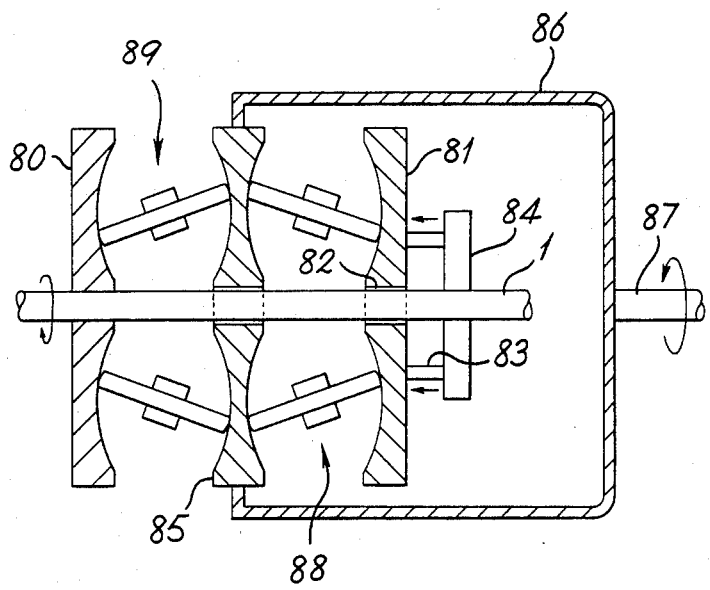

The invention will now be described, by way of example only, with reference to the accompanying drawings in which:

FIG. 1 includes both a transverse section through parts of a transmission unit, and also a schematic representation of the hydraulic circuitry of that unit and an alternative unit, and FIG. 2 is a diagrammatic axial section through part of that alternative unit.

The sectioned part of FIG. 1 shows components of a so-called "single-sided" toroidal race rolling friction transmission unit comprising a single input disc and a single output disc. The shaft 1 of the input disc 2 is formed with a toroidal race 3, the inner and outer radial boundaries of which are marked 3a, 3b respectively. A set of three rollers 4, 5 and 6 provides a driving connection between input disc 2 and a single output disc which is not shown because it lies in front of the plane of section of the Figure. In order to convey more information roller 6 is shown in full plan while rollers 4 and 5 are shown in section, with their rotational axes 7, 8 in the plane of the section, but of course in use the orientation of each rotational axis relative to shaft 1 will be substantially the same.

Roller 4 is located in bearings 4a within a carriage 9, formed at one end with a cylindrical socket 10 which makes a simple sliding fit over a ball 11 carried by a stud 12 anchored to fixed cylindrical end cap 34 of roller 5. The other end of carriage 9 is formed with a socket which receives the ball end 15 formed on the end of the shorter arm 16 of a crank 17 rotatable about a fixed pivot 18. A ball 19 formed on the end of the other arm of crank 17 engages in a socket 20 formed in a sleeve 21 rotatable about shaft 1 by an arm 22 connected to the rod 23 of an actuator piston 24 movable within a hydraulic cylinder 25 connected by way of a direction change-over valve 25a to a pump 26 which draws from a fluid reservoir 26a. Pump 26 is controllable by an operator so as to produce precise increments of travel of piston 24. These increments produce equally precise increments of rotation of ball end 15 about pivot 18, resulting in equally exact linear movements of carriage 9, these movements being accomodated by the sliding of ball 11 within socket 10. Although the movement of ball 15 is a rotary one about pivot 18, nevertheless because of the proportions of crank 17 and the limited span of rotation of sleeve 21 the resulting movement of carriage 9 and roller 4 is in effect movement along a straight line in the direction of axis 27, which passes through the centres of ball ends 11 and 15 and is the "ratio angle axis", as already described, of roller 4. Radial alignment is accommodated by the roller moving laterally in its bearings 4a, and a controlled increment of movement of the roller along the ratio angle axis will, as already described, cause that roller by reason of its reaction with input disc 2 and the output disc (not shown) to steer itself from its previous ratio angle to another angle which is determined by the amount of rotation mechanically imparted to sleeve 21.

Rollers 5 and 6 are supported by split carriages 14, 28: the studs 28a holding the two parts of carriage 28 together are shown. Carriages 14,28 can slide back and forth in tangential directions within a structure fixed between input disc 2 and the output disc by means not shown. As FIG. 1 shows, carriage 14 comprises a central double-ended piston 29 which supports the roller 5 within bearings 13. The ends of piston 29 are stepped in the form of circular central parts 30, 31 and outer annular parts 32, 33, and these piston ends slide within fixed cylindrical end caps 34, 35. Cap 34 is formed with steps 36, 37 to match steps 30, 32 of piston 29, and cap 35 is formed likewise with steps 38, 39. Low friction rings 40, of PTFE for instance, act as seals between the stepped ends of piston 29 and cylinders 34, 35. Fluid conduits 41, 42, 43 and 44 connect cylinder ends 36, 38, 37 and 39 into hydraulic circuits in a manner that will shortly be described. The mechanical details of carriage 28 correspond exactly to those that have just been described with reference to carriage 14: end cap 45, containing a central fluid conduit 41a and conduit 43a communicating with the outer cylindrical step corresponds with cap 34 and conduits 41, 43 of carriage 14, while cap 46 containing conduits 42a and 44a corresponds with cap 35 and conduits 44, 42.

As FIG. 1 shows, the outer annular steps of the end cylinders of carriages 14, 28 are in hydraulic connection with the reaction cylinder 25 of mechanically positioned roller 4, corresponding "leading" cylinders 34, 45 being in hydraulic linkage with one side of cylinder 25 and corresponding "trailing" cylinders 35, 46 being in communication with the opposite side. The outer, annular parts of the cylinders of carriages 14 and 28 are thus the parts where the necessary forces are generated to oppose the reaction loads upon pistons 29 and that for roller 6, and to ensure that the average force exerted upon each of the "hydraulic" rollers 5 and 6 equals the reaction load upon roller 4 as reflected by the pressures existing in the two sides of cylinder 25. The outer parts of the end cylinders of carriages 14 and 28 must of course be dimensioned so that the actual actuating forces generated within these parts, by fluid at the pressures existing in cylinder 25, do match the reaction load to which roller 4 is subjected.

Although as just stated the operation of the outer steps of the cylinders of pistons 29 and that for roller 6 should ensure that the average actuating force exerted upon those pistons should correspond to the reaction force experienced by mechanically operated roller 4, thus ensuring that the force-dependent ratio angle adopted by roller 4 is always duplicated by rollers 5 and 6, instability is possible. To counteract this, the central parts of the cylinders of hydraulic pistons 5, 6 are linked into a closed, hydraulic damping circuit. Thus conduit 42 communicates with conduit 41a, and conduit 42a completes the circuit by communicating with conduit 41, and within each of the communications damping is provided by means (indicated diagrammatically at 47) which may, for example, be of the type described in UK Pat. No. 1073484. The purpose of this closed-circuit damping of the hydraulic pistons 29 and that for roller 6 is as follows. Assume that both pistons are at the same ratio angle and are then subjected to a changed resultant force from the fluid in outer parts 37, 39 of cylinders 34 and 35 and the corresponding outer parts of cylinders 45 and 46, in response to a ratio change of roller 4 and the resultant change in the pressure to each side of piston 24. Assume that piston 29 moves to the right—that is to say, clockwise about the axis of shaft 1 as seen in FIG. 1—and that the piston of roller 6 moves in the same sense. If both these rollers execute equal tangential shifts then no substantial damping effect is needed nor experienced: fluid expelled from the contracting space of cylinder part 38 passes by way of conduits 42 and 41a into the expanding central part of cylinder 45, and fluid expelled from the contracting central part of cylinder 46 passes by way of conduits 42a and 41 into the expanding central part of cylinder 34. If however the pistons tend not to make equal shifts—say for instance roller 5 tends to make a larger shift than roller 6—then the effect of the two damping means 47 in the communicating conduits 42-41a and 42a-41 will be to resist excess movement of piston 29 and attract further movement from roller 6, thus tending to equalize the shifts of the two hydraulic rollers.

As has already been said, the set of the three rollers 4-6 shown in detail in FIG. 1 is an example of the single set of three rollers typically required by a "single-sided" example of a toroidal race rolling friction transmission unit, with a single input disc and single output disc. The Figures also show schematically how the invention could continue to be applied in a "double-ended" type of transmission unit, in which a second set of three rollers provides a driving connection between the output disc and a second input disc, the rollers of both sets being required to adopt the same ratio angle and bear equal reaction torque at all times. The principal components of such a "double-ended" unit are shown diagrammatically in FIG. 2: two input discs 80, 81 are mounted upon input shaft 1. Disc 80 is fixed to the shaft, but there is a splined connection 82 between the shaft and disc 81 so that they are capable of relative axial movement but prevented from relative rotation. Pistons 83 of an end-load unit 84, which for simplicity is shown fixed to shaft 1, bear against disc 81 to urge it towards disc 80. A double-sided output disc 85 is located between input discs 80 and 81, and is connected by way of a bell-shaped member 86 to an output shaft 87 coaxial with shaft 1. One set of rollers 88, which may for example be similar to rollers 4, 5 and 6 as already described, provides a driving connection between disc 81 and one side of output disc 85. A second set of rollers 89, maintained at the same ratio angle as the first set 88, makes a driving connection between disc 80 and the second side of disc 85. From the geometry of the discs and rollers it will be clear, as indicated, that shafts 1 and 87 rotate in opposite directions, as indeed do the corresponding shafts of input disc 3 and the output disc of the "single-sided" unit shown in section in FIG. 1.

In the schematic part of FIG. 1 the rollers and carriages of such a second set 89 are indicated by references 60, 61 and 62, and the tangential shifts of all three of these rollers are actuated hydraulically as for rollers 5 and 6; in the second set there is no equivalent of the mechanical actuation of roller 4. Hydraulic connections 63, 64 from the outer steps of the cylinders at opposite ends of rollers 60-62 communicate with opposite sides of reaction cylinder 25, in the same manner as cylinders 34, 35 and 45 and 46 communicate with that cylinder as already described. Likewise the central step of the cylinder at one end of each of rollers 60-62 is linked by a conduit 65 to the central step of the cylinder at the opposite end of the adjacent roller and each conduit 65 contains a damping device 66 comparable with item 47 already described, so completing for the second set of rollers a closed damping circuit comparable with that already described for hydraulic rollers 5 and 6 of the first set. The first and second sets of rollers are also linked by a fluid gallery 68 connected to a low-pressure supply 69 and containing a damping orifice 67 which serves to damp-out oscillations between the two sets of rollers 89 and 88.

I claim:

1. A toroidal race rolling friction transmission unit comprising:
   at least one input disc;
   at least one output disc;
   a first roller, and a plurality of further rollers, providing a driving connection between said input and output discs;
   first ratio-changing means including a mechanical linkage exhibiting mechanical advantage, connected to said first roller to impart precise increments of tangential shift to said first roller to cause said first roller to change ratio angle;
   a member to sense the reaction force to which said first roller is subjected in the course of transmitting torque from said input disc to said output disc;
   second ratio-changing means including first fluid-pressure-operated linear actuators connected to at least some of said further rollers, each line of action of a said actuator being aligned with the direction of tangential shift of its connected said roller, whereby to impart tangential shift to said further rollers so that they also change ratio angle, and operative connections between said fluid-pressure-operated actuators and said reaction force sensing member, whereby said actuators act upon said further rollers with a force matching said reaction force of said first roller.

2. A transmission unit according to claim 1 in which said reaction-sensing member comprises a first hydraulic piston-and-cylinder device.

3. A transmission unit according to claim 2 in which said fluid-pressure-actuators comprise second hydraulic piston-and-cylinder devices, and in which said operative connection comprise hydraulic conduits linking opposite ends of each of said second hydraulic cylinders with respective opposite ends of said first hydraulic cylinder.

4. A transmission unit according to claim 3 including a hydraulic damping system interlinking all of said second hydraulic piston-and-cylinder devices.

5. A transmission unit according to claim 4 in which said second hydraulic piston-and-cylinder devices are in the form of two-step pistons moving within hydraulic cylinders, a first of said steps being linked to said reaction-sensing member of said first roller and a second step being connected by way of said damping system with corresponding second steps in the other said second hydraulic piston-and-cylinder devices.

6. A transmission unit according to claim 5 comprising:

a first input disc formed with a first input toroidal race and a second input disc formed with a second input toroidal race, said first and second discs being mounted coaxially so that said first and second races face inwards towards each other;

an output disc formed with first and second oppositely-facing output toroidal races, located coaxial with and between said first and second input discs;

a driving connection, comprising said first and said further rollers between said first input and output toroidal races, and a second set of rollers transmitting drive between said second input and output races;

said second ratio-changing means including second fluid-pressure-operated actuators connected to the rollers of said second set whereby to cause them to change ratio angle;

further conduits linking said second actuators with said reaction-sensing member, whereby to achieve a common ratio angle between said first and said further rollers and the rollers of said second set, and yet further hydraulic conduits linking said second hydraulic actuators both with themselves and with said first fluid-pressure-operated actuators for damping purposes.

7. A transmission unit according to claim 1 in which said mechanical linkage comprises a crank with arms of unequal length.

* * * * *